(12) United States Patent
Klun et al.

(10) Patent No.: US 8,383,694 B2
(45) Date of Patent: Feb. 26, 2013

(54) POLYMERIZABLE COMPOSITION COMPRISING PERFLUOROPOLYETHER MATERIAL HAVING ETHYLENE OXIDE REPEAT UNIT SEGMENT

(75) Inventors: Thomas P. Klun, Lakeland, MN (US); Richard J. Pokorny, Maplewood, MN (US); Joan M. Noyola, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/396,158

(22) Filed: Feb. 14, 2012

(65) Prior Publication Data

US 2012/0142856 A1    Jun. 7, 2012

Related U.S. Application Data

(60) Division of application No. 12/515,914, filed as application No. PCT/US2007/085551 on Nov. 27, 2007, now abandoned, which is a continuation-in-part of application No. 11/564,463, filed on Nov. 29, 2006, now abandoned.

(51) Int. Cl.
    *C08G 18/67* (2006.01)
(52) U.S. Cl. ............... 522/97; 522/90; 522/92; 522/93; 522/98; 522/156; 528/59; 528/70; 528/75; 528/76; 528/85
(58) Field of Classification Search ............ 522/90, 522/92, 93, 97, 98, 156; 528/59, 70, 75, 528/76, 85
See application file for complete search history.

(56) References Cited

U.S. PATENT DOCUMENTS

| | | | |
|---|---|---|---|
| 4,818,801 A | 4/1989 | Rice | |
| 4,825,249 A | 4/1989 | Oki | |
| 5,002,978 A | 3/1991 | Goldenberg | |
| 5,822,489 A | 10/1998 | Hale | |
| 5,846,650 A | 12/1998 | Ko | |
| 5,948,478 A | 9/1999 | Lenti | |
| 6,376,572 B1 | 4/2002 | Turri | |
| 6,582,759 B1 | 6/2003 | Qiu | |
| 6,815,040 B2 | 11/2004 | Pellerite | |
| 6,906,115 B2 | 6/2005 | Hanazawa | |
| 7,537,828 B2 | 5/2009 | Coggio | |
| 2005/0072336 A1 | 4/2005 | Itoh | |
| 2005/0106404 A1 | 5/2005 | Hayashida | |
| 2005/0112319 A1 | 5/2005 | Itoh | |
| 2005/0123741 A1 | 6/2005 | Hayashida | |
| 2005/0158504 A1 | 7/2005 | Itoh | |
| 2005/0158558 A1 | 7/2005 | Hayashida | |
| 2005/0249940 A1 | 11/2005 | Klun | |
| 2005/0288385 A1* | 12/2005 | Kondo et al. | 522/83 |
| 2006/0084756 A1 | 4/2006 | Southwell | |
| 2006/0216500 A1 | 9/2006 | Klun | |
| 2006/0216524 A1* | 9/2006 | Klun et al. | 428/423.1 |
| 2008/0124555 A1 | 5/2008 | Klun | |
| 2010/0055470 A1 | 3/2010 | Klun | |

FOREIGN PATENT DOCUMENTS

| | | |
|---|---|---|
| EP | 0379462 | 7/1990 |
| EP | 0 537 360 | 4/1993 |
| EP | 0870778 | 10/1998 |
| EP | 0743349 | 5/2003 |
| EP | 1411073 | 4/2004 |
| JP | 10-110118 | 4/1998 |
| JP | 2004-204096 | 7/2004 |
| JP | 2004-043671 | 12/2004 |
| JP | 2006-037024 | 2/2006 |
| WO | WO 03/072625 | 9/2003 |
| WO | WO 03/099904 | 12/2003 |
| WO | WO 2004/044062 | 5/2004 |
| WO | WO 2005/049687 | 2/2005 |
| WO | WO 2005/103175 | 11/2005 |
| WO | WO 2005/111157 | 11/2005 |
| WO | WO 2005/113641 | 12/2005 |
| WO | WO 2006/007507 | 1/2006 |
| WO | WO 2006/073920 | 7/2006 |
| WO | WO 2006/102383 | 9/2006 |

* cited by examiner

*Primary Examiner* — Michael L Leonard
(74) *Attorney, Agent, or Firm* — Carolyn A. Fischer

(57) ABSTRACT

Presently is described a free-radically polymerizable composition comprising a mixture of reaction products of i) at least one polyisocyanate; ii) at least one isocyanate reactive perfluoropolyether compound; iii) at least one isocyanate reactive compound comprising greater than 6 repeat units of ethylene oxide; and iv) at least one isocyanate reactive non-fluorinated crosslinker comprising at least two free-radically polymerizable groups.

20 Claims, No Drawings

POLYMERIZABLE COMPOSITION COMPRISING PERFLUOROPOLYETHER MATERIAL HAVING ETHYLENE OXIDE REPEAT UNIT SEGMENT

RELATED APPLICATION DATA

This is a Divisional of application Ser. No. 12/515,914, filed May 21, 2009, (abandoned), which is a national stage filing under 35 U.S.C. 371 of PCT/US2007/085551, filed 27 Nov. 2007 (published as WO2008/067262), which is a continuation-in-part of U.S. application Ser. No. 11/564,463, filed Nov. 29, 2006 (abandoned), the disclosure of which is incorporated by reference in its/their entirety herein.

BACKGROUND OF THE INVENTION

Hardcoats have been used to protect the face of optical displays. Hardcoats typically contain inorganic oxide particles, e.g., silica, of nanometer dimensions dispersed in a binder precursor resin matrix, and sometimes are referred to as "ceramers".

U.S. Pat. Nos. 6,132,861 (Kang et al. '861); 6,238,798 B1 (Kang et al. '798); 6,245,833 B1 (Kang et al. '833); 6,299,799 (Craig et al.) and Published PCT Application No. WO99/57185 (Huang et al.) describe ceramer compositions containing blends of colloidal inorganic oxide particles, a curable binder precursor and certain fluorochemical compounds.

U.S. Pat. Nos. 6,660,388; 6,660,389; 6,841,190 (Liu et al.) as well as U.S. Pat. No. 7,101,618 describe antisoiling hardcoated films suitable for use as protective films for display devices.

WO2005/111157 describes (Abstract) a hardcoat coating composition for use as a stain repellent single layer on an optical display. The hardcoat coating composition comprises a mono or multi(methyl)acrylate bearing at least one monovalent hexafluoropolypropylene oxide derivative and a free radically reactive fluoroalkyl-group or fluoroalkylene-group containing acrylate compatibilizer.

WO2006/102383 and WO03/002628 describe various polymerizable perfluoropolyether urethane additives and their use in hardcoats.

WO03/002628 describes (Abstract) A perfluoropolyether-containing composition which has an affinity for nonfluorinated substrates and can form on the surface thereof a film firmly adherent to the surface. It is a composition containing carbon-carbon double bonds which comprises (A) a triisocyanate obtained by trimerizing a diisocyanate and (B) a combination of at least two compounds having active hydrogen, the component (B) comprising (B-1) a perfluoropolyether having at least one active hydrogen atom and (B-2) a monomer having an active hydrogen atom and a carbon-carbon double bond.

SUMMARY OF THE INVENTION

Presently described are articles such as optical displays comprising a (e.g. light-transmissive optical) substrate having a surface layer that comprises the reaction product of a polymerizable mixture comprising at least one perfluoropolyether (e.g. urethane) material comprising at least two free-radically polymerizable groups and at least one segment having greater than 6 ethylene oxide repeat units; and at least one non-fluorinated binder precursor comprising at least two free-radically polymerizable groups. In another embodiment, a free-radically polymerizable composition is described comprising a mixture of reaction products of i) at least one polyisocyanate; ii) at least one isocyanate reactive perfluoropolyether compound; iii) at least one isocyanate reactive compound comprising greater than 6 repeat units of ethylene oxide; and iv) at least one isocyanate reactive non-fluorinated crosslinker comprising at least two free-radically polymerizable groups. The composition may be a coating dispersed in an alcohol-containing solvent that is particularly useful for coating optical substrates such as polycarbonate, acrylic, cellulose acetate, and cellulose triacetate.

In each of these embodiments, the perfluoropolyether (e.g. urethane) material preferably comprises at least two (meth) acrylate groups such as a terminal group having at least two (meth)acrylate groups. The perfluoropolyether urethane may comprise a monovalent perfluoropolyether moiety such as $F(CF(CF_3)CF_2O)_aCF(CF_3)$— wherein "a" ranges from 4 to 15. The binder precursor preferably comprises least one (e.g. non-fluorinated) hydrocarbon crosslinker that comprises at least three free-radically polymerizable groups is typically employed. In some aspects, the surface layer or polymerizable composition further comprises inorganic oxide particles. In other aspects, a hardcoat layer comprising inorganic oxide particles is disposed between the substrate and the (e.g. inorganic particle-free) surface layer.

DETAILED DESCRIPTION AND PREFERRED EMBODIMENTS

Presently described are articles such as optical displays including a light tranmissive optical substrate. The surface layer of the optical substrate comprises the reaction product of a polymerizable mixture comprising at least one free-radically polymerizable perfluoropolyether (e.g. urethane) material having at least one segment that comprises ethylene oxide repeat units; and at least one non-fluorinated binder precursor comprising at least two free-radically polymerizable groups.

One exemplary free-radically polymerizable perfluoropolyether material is a perfluoropolyether urethane material that comprises a mixture of reaction products of
i) at least one polyisocyanate,
ii) at least one isocyanate reactive perfluoropolyether compound,
iii) at least one isocyanate reactive compound containing greater than 6 ethylene oxide repeat units, and
iv) at least one isocyanate reactive (e.g. non-fluorinated) hydrocarbon crosslinker comprising two or more free-radically polymerizable groups.

The perfluoropolyether compound (i.e. ii) and ethylene oxide repeat unit containing compound (i.e. iii) preferably comprise at least one (e.g. terminal) alcohol, thiol, or amine group. Typically both the perfluoropolyether compound and the ethylene oxide compound contain (e.g. terminal) reactive alcohol groups.

In one embodiment, a monofunctional perfluoropolyether compound and a monofunctional ethylene oxide repeat unit containing compound are employed as reactants with the polyisocyanate. In another embodiment, a multifunctional perfluoropolyether compound and a monofunctional ethylene oxide repeat unit containing compound are employed. In yet another embodiment, a multifunctional perfluoropolyether compound and a multifunctional ethylene oxide repeat unit containing compound are employed. When at least two multifunctional isocyanate reactive compounds are employed in the synthesis, the reaction product typically includes a major amount of a perfluoropolyether polymeric material.

The hydrocarbon crosslinker (i.e. iv) typically comprises (meth)acryl groups such as (meth)acrylate groups. A substantial excess of hydrocarbon crosslinker (i.e. iv) is typically employed such that the perfluoropolyether urethane polymeric material as well as other reaction products of the reaction mixture comprise unreacted free-radically polymerizable groups which can be subsequently cured for example by radiation (e.g. UV) curing.

Typically, the perfluoropolyether urethane composition is made by first reacting a polyisocyanate with a perfluoropolyether compound containing an alcohol, thiol, or amine group, followed by reaction with one or more ethylene oxide repeat unit-containing compounds containing an alcohol, thiol, or amine group. The perfluoropolyether urethane additive is then combined with the (e.g. non-fluorinated) isocyanate reactive multifunctional free-radically polymerizable (e.g. (meth)acrylate) crosslinker. Alternatively, these perfluoropolyether urethane additives can be formed by other reaction sequences such as by first reacting the polyisocyanate with the crosslinker, followed by the addition of the ethylene oxide repeat unitcontaining compound. In addition, the perfluoropolyether urethane additive could be made by reacting all four components concurrently.

Although these reaction sequences are generally conducted in a solvent that does not contain hydroxyl groups (such as MEK) in the presence of a catalyst such as an organotin compound, the composition thus formed has improved compatibility with hydroxyl group containing solvents, commonly know as alcohols. Alcohol based coating compositions are especially useful for coating light transmissive substrates such as polycarbonate, acrylic, cellulose acetate, and cellulose triacetate which are susceptible to swelling, cracking, or crazing by organic solvents such as ketones (e.g. MEK), aromatic solvents (e.g. toluene), and esters (e.g. acetate solvents).

One or more polyisocyanate materials are employed in the preparation of the perfluoropolyether urethane. A variety of polyisocyanates may be utilized as component i) in the preparation of the perfluoropolyether urethane polymeric material. "Polyisocyanate" means any organic compound that has two or more reactive isocyanate (—NCO) groups in a single molecule such as diisocyanates, triisocyanates, tetraisocyanates, etc., and mixtures thereof. Cyclic and/or linear polyisocyanate molecules may be usefully be employed. For improved weathering and diminished yellowing the polyisocyanate(s) of the isocyanate component is typically aliphatic.

For embodiments wherein the perfluoropolyether compound, ethylene oxide repeat unit-containing compound, and hydrocarbon crosslinker have monofunctional isocyanate reactivity the isocyanate employed is typically at least trifunctional. However, when one of more of the isocyanate reactive compounds have at least difunctional isocyanate reactivity, difunctional isocyanates can be employed.

Useful aliphatic polyisocyanates include, for example, bis (4-isocyanatocyclohexyl)methane ($H_{12}$ MDI) such as available from Bayer Corp., Pittsburgh, Pa. under the trade designation "Desmodur W"; isophorone diisocyanate (IPDI) such as commercially available from Huels America, Piscataway, N.J.; hexamethylene diisocyanate (HDI) such as commercially available from Aldrich Chemical Co., Milwaukee, Wis.; trimethyl hexamethylene diisocyanate such as commercially available from Degussa, Corp., Dusseldorf, Germany under the trade designation "Vestanate TMDI"; and m-tetramethylxylene diisocyanate (TMXDI) such as commercially available from Aldrich Chemical Co., Milwaukee, Wis. Although typically less preferred, aromatic isocyanates such as diphenylmethane diisocyanate (MDI) such as commercially available from Bayer Corp., Pittsburgh, Pa. under the trade designation "Mondur M"; toluene 2,4-diisocyanate (TDI) such as commercially available from Aldrich Chemical Co., Milwaukee, Wis., and 1,4-phenylene diisocyanate are also useful.

Preferred polyisocyanates include derivatives of the above-listed monomeric polyisocyanates. These derivatives include, but are not limited to, polyisocyanates containing biuret groups, such as the biuret adduct of hexamethylene diisocyanate (HDI) available from Bayer Corp. under the trade designation "Desmodur N-100", polyisocyanates based on HDI containing isocyanurate groups, such as that available from Bayer Corp. under trade designation "Desmodur N-3300", as well as polyisocyanates containing urethane groups, uretdione groups, carbodiimide groups, allophonate groups, and the like. These derivatives are preferred as they are polymeric, exhibit very low vapor pressures and are substantially free of isocyanate monomer.

Other polyisocyanates that may be used are available from Bayer Polymers LLC of Pittsburgh, Pa. under the trade designations "Desmodur TPLS2294", and "Desmodur N 3600"

One or more isocyanate reactive perfluoropolyether materials are employed in the preparation of the perfluoropolyether urethane. Various isocyanate reactive perfluoropolyethers materials can be utilized as component ii). The synthesis of various perfluoropolyether materials having (e.g. terminal) isocyanate reactive groups such as OH, SH or NHR wherein R is H of an alkyl group of 1 to 4 carbon atoms is known. For example, a methyl ester material (e.g. having an average molecular weight of 1,211 g/mol) for preparation of the alcohol can be prepared according to the method reported in U.S. Pat. No. 3,250,808 (Moore et al.), with purification by fractional distillation. Perfluoropolyether alcohol materials can be made by a procedure similar to that described in U.S. Publication No. 2004/0077775, filed May 24, 2002. Perfluoropolyether alcohol materials having an SH group can be made using this same process by use of aminoethane thiol rather than aminoethanol. Perfluoropolyether amine materials can be synthesized as described in US 2005/0250921.

The isocyanate reactive perfluoropolyether materials include one or more compounds of those of the formula:

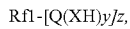

Rf1-[Q(XH)y]z, where

Rf1 is a monovalent (where z is 1) or divalent (where z is 2) perfluoropolyether;

Q is a connecting group having a valency of at least 2;

X is O, S, or NR, where R is H or lower alkyl of 1 to 4 carbon atoms;

y is 1 or 2, and z is 1 or 2.

Q can comprise a straight chain, branched chain, or cyclic-containing connecting group. Q can include an alkylene, an arylene, an aralkylene, an alkarylene. Q can optionally include heteroatoms such as O, N, and S, and combinations thereof. Q can also optionally include a heteroatom-containing functional group such as carbonyl or sulfonyl, and combinations thereof.

The perfluoropolyether urethane material is preferably prepared from an isocyanate reactive HFPO-material. Unless otherwise noted, "HFPO-" refers to the end group $F(CF(CF_3)CF_2O)_aCF(CF_3)$— of the methyl ester $F(CF(CF_3)CF_2O)_aCF(CF_3)C(O)OCH_3$, wherein "a" averages 2 to 15. In some embodiments, "a" averages between 3 and 10 or "a" averages between 5 and 8. Such species generally exist as a distribution or mixture of oligomers with a range of values for "a", so that the average value of a may be non-integer. For example, in one embodiment, "a" averages 6.2. The molecular weight of the HFPO-perfluoropolyether material varies depending on the number "a" of repeat units from about 940 g/mole to about 1600 g/mole, with 1100 g/mole to 1400 g/mole typically being preferred.

One or more isocyanate reactive ethylene oxide repeat unit-containing materials are employed in the preparation of the perfluoropolyether urethane. The ethylene oxide containing isocyanate reactive compound generally comprises greater than 6 repeat units of ethylene oxide. The number of ethylene oxide repeat units may be at least 7, 8, or 9 repeat units. In some embodiments, the isocyanate reactive ethylene oxide containing compound has at least 10 repeat units of ethylene oxide. For example, the number of repeat units may be 11, 12, 13, 14, 15, 16, 17, 18, 19, or 20. Generally the number of ethylene oxide repeat units does not exceed about 50 and may be for example up to 25, 30, or 35 repeat units.

The ethylene oxide containing compounds may be represented by the following formula:

$(HX)_b(C_2H_4O)_jR^{EO}$ wherein
X is O, S or NR, where R is H or lower alkyl of 1 to 4 carbon atoms; and
$R^{EO}$ is H; H a group selected from alkyl, aryl, alkaryl, aralkyl, that can optionally be substituted with a heteroatom, a heteroatom functional groups (such as —OH—SH, and —NH$_2$), or optionally substituted with a (meth)acryl functional group; or —C(O)C(R$_2$)=CH$_2$ where R$_2$ is a lower alkyl of 1 to 4 carbon atoms or H or F;
b ranges from 1 to 4 and is typically 1 or 2; and
j ranges from 7 to 50.

In some embodiments, $R^{EO}$ is H or a lower alkyl of 1 to 4 carbon atoms such as CH$_3$. Such embodiments have been found to result in surface layers having low lint attraction.

The ethylene oxide containing compound may also comprise other alkylene oxide compounds such as propylene oxide. In such embodiment, a major amount of the alkylene oxide repeat units are typically ethylene oxide repeat units.

Various isocyanate reactive non-fluorinated hydrocarbon crosslinkers can be employed in the synthesis of the perfluoropolyether urethane polymeric material. Such crosslinkers comprise at least two and preferably three free-radically polymerizable groups. The free-radically polymerizable groups are preferably (meth)acryl and more preferably (meth)acrylate groups.

Suitable isocyanate reactive non-fluorinated hydrocarbon crosslinkers may be described by the formula:

$(HO)_bQ(A)_p;$ wherein
Q is a connecting group having a valency of at least 2;
A is a (meth)acryl functional group such as —XC(O)C(R$^2$)=CH$_2$, where
 X is O, S or NR, where R is H or lower alkyl of 1 to 4 carbon atoms, and
 R$_2$ is a lower alkyl of 1 to 4 carbon atoms or H or F;
b ranges from 1 to 4 and is preferably 1 or 2; and
p ranges from 2 to 6.

Q can comprise a straight chain, branched chain, or cyclic-containing connecting group as previously described.

Exemplary isocyanate reactive crosslinkers include for example 1,3-glycerol dimethacrylate available from Echo Resin Inc. of Versailles, Mo. and pentaerythritol triacrylate, available from Sartomer of Exton, Pa. under the trade designation "SR444C". Additional useful isocyanate reactive (meth)acrylate crosslinkers include hydantoin moiety-containing poly(meth)acrylates, for example, as described in U.S. Pat. No. 4,262,072 (Wendling et al.).

If the mole fraction of isocyanate groups is arbitrarily given a value of 1.0, then the total mole fraction of isocyanate reactive groups used in making the perfluoropolyether urethane material is 1.0 or greater. Although, the polymerizable compositions described herein typically comprise at least 0.2 mole fraction of crosslinking agent(s), it is typically preferred to maximize the concentration of isocyanate reactive hydrocarbon crosslinker to improve the durability and compatibility with the binder of the hardcoat. Accordingly, the total amount of crosslinking agent(s) may comprise at least 0.5 mole fraction and may be at least 0.6 mole fraction, at least 0.7 mole fraction, at least 0.8 mole fraction, or at least 0.9 mole of the sum of the isocyanate reactants. The mole fraction of the perfluoropolyether reactant is typically at least 0.05 and no greater than 0.5. The mole fraction of ethylene oxide repeat unit containing reactant is also typically at least 0.05 or 0.10 and no greater than 0.7, 0.6, or 0.5.

The reaction product generally includes a distribution of various reaction products. In addition to the reaction product of the polyisocyanate with all three reactants (ii, iii, and iv) the reaction product of the polyisocyanate with two of the three as well as reaction products of the polyisocyanate the individual reactants are also present.

For example, one representative structure formed by the reaction product of a biuret of HDI with one equivalent of HFPO oligomer amidol HFPO—C(O)NHCH$_2$CH$_2$OH wherein "a" averages 2 to 15, and further with two equivalents of pentaerythritol triacrylate is shown as follows

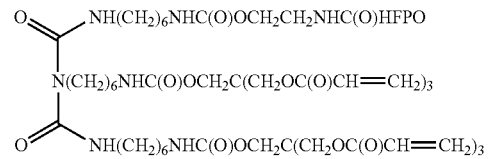

In one preferred embodiment, the perfluoropolyether urethane composition is of the formula:

Ri-(NHC(O)XQRf),—(NHC(O)OQ(A)p),—(NHC(O)X(C$_2$H$_4$O)$_j$R$^{EO}$, wherein Ri is a residue of a multi-isocyanate;
X are each independently O, S or NR, where R is H or lower alkyl of 1 to 4 carbon atoms;
Q is independently a connecting group of valency at least 2;
Rf is a monovalent perfluoropolyether moiety composed of groups comprising the formula F(RfcO)xCdF2d-, wherein each Rfc independently represents a fluorinated alkylene group having from 1 to 6 carbon atoms, each x independently represents an integer greater than or equal to 2, and wherein d is an integer from 1 to 6;
A is a (meth)acryl functional group such as —XC(O)C(R2)=CH2, where R2 is a lower alkyl of 1 to 4 carbon atoms or H or F;
p is 2 to 6;
j ranges from 7 to 40; and
$R^{EO}$ is H; a group selected from alkyl, aryl, alkaryl, aralkyl, that can optionally be substituted with a heteroatom, a heteroatom functional groups (such as —OH—SH, and —NH$_2$), or optionally substituted with a (meth)acryl functional group; or —C(O)C(R$_2$)=CH$_2$ where R$_2$ is a lower alkyl of 1 to 4 carbon atoms or H or F.

Depending on the number of individual materials employed as well as the functionality of the reactants, a variety of perfluoropolyether urethane materials can be prepared having at least one of each of the units of this formula.

Q in association with the Rf group is a straight chain, branched chain, or cycle-containing connecting group as previously described.

In some embodiments when X is O, Q is typically not methylene and thus contains two or more carbon atoms. In other embodiments, X is S or NR. In some embodiments, Q is an alkylene having at least two carbon atoms. In other embodiments, Q is a straight chain, branched chain, or cycle-containing connecting group selected from arylene, aralkylene, and alkarylene. In yet other embodiments, Q contains a heteroatom such as O, N, and S and/or a heteroatom containing functional groups such as carbonyl and sulfonyl. In other embodiments, Q is a branched or cycle-containing alkylene group that optionally contains heteroatoms selected from O, N, S and/or a heteroatom-containing functional group such as carbonyl and sulfonyl. In some embodiments Q contains a nitrogen containing group such an amide group such as —C(O)NHCH$_2$CH$_2$—, —C(O)NH(CH$_2$)$_6$—, and —C(O)NH(CH$_2$CH$_2$O)$_2$CH$_2$CH$_2$—.

Various other reactants can be included in the preparation of the perfluoropolyether urethane such as described in WO2006/102383.

The perfluoropolyether urethane polymeric material described herein may be employed alone or in combination with various other fluorinated compounds having at least one moiety selected from fluoropolyether, fluoroalkyl, and fluoroalkylene linked to at least one free-radically reactive group. When a second fluorinated compound is employed, it is typically preferred that such second fluorinated compound also comprises an HFPO— moiety. Various fluorinated materials that can be employed in combination with the perfluoropolyether urethane polymeric material described are also described in WO2006/102383.

The polymerizable perfluoropolyether urethane composition is typically dispersed in a hardcoat composition in combination with a (e.g. alcohol based) solvent, applied to an optical substrate and photocured to form the easy to clean, stain and ink repellent light transmissible surface layer. The hardcoat is a tough, abrasion resistant layer that protects the optical substrate and the underlying display screen from damage from causes such as scratches, abrasion and solvents. Typically the hardcoat is formed by coating a curable liquid ceramer composition onto the substrate and curing the composition in situ to form a hardened film.

The surface energy can be characterized by various methods such as contact angle and ink repellency, as determined by the test methods described in the Examples. In this application, "stain repellent" refers to a surface treatment exhibiting a static contact angle with water of at least 70 degrees. More preferably, the contact angle is at least 80 degrees and most preferably at least 90 degrees. Alternatively, or in addition thereto, the advancing contact angle with hexadecane is at least 50 degrees and more preferably at least 60 degrees. Low surface energy results in anti-soiling and stain repellent properties as well as rendering the exposed surface easy to clean.

Another indicator of low surface energy relates to the extent to which ink from a pen or marker beads up when applied to the exposed surface. The surface layer and articles exhibit "ink repellency" when ink from pens and markers beads up into discrete droplets and can be easily removed by wiping the exposed surface with tissues or paper towels, such as tissues available from the Kimberly Clark Corporation, Roswell, Ga. under the trade designation "SURPASS FACIAL TISSUE." Durability can be defined in terms of results from a modified oscillating sand test (Method ASTM F 735-94) carried out at 250 rpm for 5 minutes as described in the Test Methods of this application. Preferably, a durable coating exhibits an ink repellency loss value of 65 mm (75% loss) or less, more preferably 40 mm (45% loss) or less, most preferably 0 mm (no loss) of ink repellency (IR) in this test.

The perfluoropolyether urethane polymeric material described herein can be employed as the sole fluorinated component of a one-layer hardcoat composition. For embodiments wherein high durability is desired, the hardcoat composition typically further comprises (e.g. surface modified) inorganic particles. The thickness of the hardcoat surface layer is typically at least 0.5 microns, preferably at least 1 micron, and more preferably at least 2 microns. The thickness of the hardcoat layer is generally no greater than 25 microns. Preferably the thickness ranges from 3 microns to 5 microns.

Alternatively, an inorganic particle free perfluoropolyether urethane polymer containing surface layer may be employed alone for uses where durability is not required. In yet other embodiments, an inorganic particle free perfluoropolyether urethane polymer containing surface layer may be provided in combination with an inorganic particle containing hardcoat layer disposed between the substrate and the surface layer. This will be referred to as a two-layer hardcoat. In these embodiments, the surface layer preferably has a thickness ranging from about 10 to 200 nanometers.

For one-layer hardcoat embodiments, the total of all (per)fluorinated compounds, (e.g. the perfluoropolyether urethane(s) alone or in combination with other fluorinated compounds) ranges from 0.01% to 10%, and more preferably from 0.1% to 5%, of the total solids of the hardcoat composition. For two-layer hardcoat embodiments the amount of perfluoropolyether urethane(s) in the coating compositions ranges from 0.01 to 50 wt-% solids, and more preferably from 1 to 25 wt-% solids.

A variety of binder precursors that form a crosslinked polymeric matrix upon curing can be employed in the hardcoat. The isocyanate reactive non-fluorinated crosslinking materials previously described are suitable binder precursors.

Di(meth)acryl binder precursors include for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate.

Tri(meth)acryl binder precursor include for example glycerol triacrylate, trimethylolpropane triacrylate, ethoxylated trimethylolpropane triacrylates (e.g. having 3 to 20 ethoxylate repeat), propoxylated glyceral triacrylates, trimethylolpropane triacrylate, tris(2-hydroxyethyl)isocyanurate triacrylate. Higher functionality (meth)acryl containing compounds include for example ditrimethylolpropane tetraacrylate, dipentaerythritol pentaacrylate, ethoxylated pentaerythritol tetraacrylate, caprolactone modified dipentaerythritol hexaacrylate.

One commercially available form of pentaerythritol triacrylate ("PET3A") is SR444C and one commercially available form of pentaerythritol tetraacrylate ("PET4A") is SR295, each available from Sartomer Company of Exton, Pa.

Oligomeric (meth)acryl such as urethane acrylates, polyester acrylates, epoxy acrylates; and polyacrylamide analogues of the foregoing can also be employed as the binder.

In one embodiment, the binder may comprise one or more N,N-disubstituted acrylamide and or N-substituted-N-vinyl-amide monomers as described in Bilkadi et al. The hardcoat may be derived from a ceramer composition containing about 20 to about 80% ethylenically unsaturated monomers and about 5 to about 40% N,N-disubstituted acrylamide monomer or N-substituted-N-vinyl-amide monomer, based on the total weight of the solids in the ceramer composition.

To facilitate curing, polymerizable compositions described herein may further comprise at least one free-radical thermal initiator and/or photoinitiator. Typically, if such an initiator and/or photoinitiator are present, it comprises less than about 10 percent by weight, more typically less than about 5 percent of the polymerizable composition, based on the total weight of the polymerizable composition. Free-radical curing techniques are well known in the art and include, for example, thermal curing methods as well as radiation curing methods such as electron beam or ultraviolet radiation. Further details concerning free radical thermal and photopolymerization techniques may be found in, for example, U.S. Pat. Nos. 4,654,233 (Grant et al.); 4,855,184 (Klun et al.); and 6,224,949 (Wright et al.).

Useful free-radical thermal initiators include, for example, azo, peroxide, persulfate, and redox initiators, and combinations thereof.

Useful free-radical photoinitiators include, for example, those known as useful in the UV cure of acrylate polymers such as described in WO2006/102383.

The polymerizable composition for use as the surface layer or an underlying hardcoat layer preferably contains surface modified inorganic particles that add mechanical strength and durability to the resultant coating.

A variety of inorganic oxide particles can be used in the hardcoat. The inorganic oxide particles can consist essentially of or consist of a single oxide such as silica, or can comprise a combination of oxides, such as silica and aluminum oxide, or a core of an oxide of one type (or a core of a material other than a metal oxide) on which is deposited an oxide of another type. Silica is a common inorganic particle. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid), e.g., as described in U.S. Pat. Nos. 5,648,407 (Goetz et al.); 5,677,050 (Bilkadi et al.) and 6,299,799 (Craig et al.). Aqueous sols (e.g. of amorphous silica) can be employed. Sols generally contain at least 2 wt-%, at least 10 wt-%, at least 15 wt-%, at least 25 wt-%, and often at least 35 wt-% colloidal inorganic oxide particles based on the total weight of the sol. The amount of colloidal inorganic oxide particle is typically no more than 50 wt-% (e.g. 45 wt-%). The surface of the inorganic particles can be "acrylate functionalized" as described in Bilkadi et al. The sols can also be matched to the pH of the binder, and can contain counter ions or water-soluble compounds (e.g., sodium aluminate), all as described in Kang et al. '798.

Various high refractive index inorganic oxide particles can be employed such as for example zirconia ("$ZrO_2$"), titania ("$TiO_2$"), antimony oxides, alumina, tin oxides, alone or in combination. Mixed metal oxide may also be employed. Zirconias for use in the high refractive index layer are available from Nalco Chemical Co. under the trade designation "Nalco OOSSOO8" and from Buhler AG Uzwil, Switzerland under the trade designation "Buhler zirconia Z-WO sol". Zirconia nanoparticle can also be prepared such as described in U.S. Pat. Nos. 7,241,437 and 6,376,590.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependant upon several factors such as particle size, particle type, modifier molecular wt, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilylpropyl)methoxyethoxyethoxyethyl carbamate, N-(3-triethoxysilylpropyl)methoxyethoxyethoxyethyl carbamate, 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltri-isopropenoxysilane, vinyltris(2-methoxyethoxy)silane, styrylethyltrimethoxysilane, mercaptopropyltrimethoxysilane, 3-glycidoxypropyltrimethoxysilane, acrylic acid, meth-acrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

The surface modification of the particles in the colloidal dispersion can be accomplished in a variety known ways, such as described in U.S. Pat. Nos. 7,241,437 and 6,376,590.

A combination of surface modifying agents can be useful, wherein at least one of the agents has a functional group co-polymerizable with a hardenable resin. Combinations of surface modifying agent can result in lower viscosity. For example, the polymerizing group can be ethylenically unsaturated or a cyclic function subject to ring opening polymerization. An ethylenically unsaturated polymerizing group can be, for example, an acrylate or methacrylate, or vinyl group. A cyclic functional group subject to ring opening polymerization generally contains a heteroatom such as oxygen, sulfur or nitrogen, and preferably a 3-membered ring containing oxygen such as an epoxide.

A preferred combination of surface modifying agent includes at least one surface modifying agent having a functional group that is copolymerizable with the organic component of the polymerizable resin and a second amphiphilic modifying agent, such as a polyether silane, that may act as a dispersant. The second modifying agent is preferably a poly-alkyleneoxide containing modifying agent that is optionally co-polymerizable with the organic component of the polymerizable composition.

Surface modified colloidal nanoparticles can be substantially fully condensed. Non-silica containing fully condensed nanoparticles typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

The inorganic particles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to provide sufficiently transparent high-refractive index coatings. The average particle size of the inorganic oxide particles can be measured using transmission electron microscopy to count the number of inorganic oxide particles of a given diameter.

The optical film having a perfluoropolyether urethane containing surface layer as described herein may have a gloss or matte surface. Matte films typically have lower transmission and higher haze values than typical gloss films. For examples the haze is generally at least 5%, 6%, 7%, 8%, 9%, or 10% as measured according to ASTM D1003. Whereas gloss surfaces typically have a gloss of at least 130 as measured according to ASTM D 2457-03 at 60°; matte surfaces have a gloss of less than 120.

A particulate matting agent can be incorporated into the polymerizable composition in order to impart anti-glare properties to the surface layer. The particulate matting agent can prevent uneven coloration caused by interference with an associated hard coat layer.

Exemplary systems incorporating matting agents into a hard coating layer, but having a different hard coating composition, are described, for example, in U.S. Pat. No. 6,693,746. Further, exemplary matte films are commercially available from U.S.A. Kimoto Tech of Cedartown, Ga., under the trade designation "N4D2A."

The amount of particulate matting agent added is between about 0.5 and 10% of the total solids of the composition, depending upon the thickness of the layer, with a preferred amount around 2%.

The average particle diameter of the particulate matting agent has a predefined minimum and maximum that is partially dependent upon the thickness of the layer. However, generally speaking, average particle diameters below 1.0 microns do not provide the degree of anti-glare sufficient to warrant inclusion, while average particle diameters exceeding 10.0 microns deteriorate the sharpness of the transmission image. The average particle size is thus preferably between about 1.0 and 10.0 microns, and more preferably between 1.7 and 3.5 microns, in terms of the number-averaged value measured by the Coulter method.

As the particulate matting agent, inorganic particles or resin particles are used including, for example, amorphous silica particles, $TiO_2$ particles, $Al_2O_3$ particles, cross-linked acrylic polymer particles such as those made of cross-linked poly(methyl methacrylate), cross-linked polystyrene particles, melamine resin particles, benzoguanamine resin particles, and cross-linked polysiloxane particles. By taking into account the dispersion stability and sedimentation stability of the particles in the coating mixture for the anti-glare layer and/or the hard coat layer during the manufacturing process, resin particles are more preferred, and in particular cross-linked polystyrene particles are preferably used since resin particles have a high affinity for the binder material and a small specific gravity.

As for the shape of the particulate matting agent, spherical and amorphous particles can be used. However, to obtain a consistent anti-glare property, spherical particles are desirable. Two or more kinds of particulate materials may also be used in combination.

One commercially available silica particulate matting agent having an average particle size of 3.5 microns is commercially available from W.R. Grace and Co., Columbia, Md. under the trade designation "Syloid C803".

The attraction of the perfluoropolyurethane-containing hardcoat surface to lint can be further reduced by including an antistatic agent. For example, an antistatic coating can be applied to the (e.g. optionally primed) substrate prior to coating the hardcoat.

The thickness of the antistatic layer is typically at least 20 nm and generally no greater than 400 nm, 300 nm, or to 200 nm.

The antistatic coating may comprise at least one conductive polymer as an antistatic agent. Various conductive polymers are known. Examples of useful conductive polymers include polyaniline and derivatives thereof, polypyrrole, and polythiophene and its derivatives. One particularly suitable polymer is poly(ethylenedioxythiophene) (PEDOT) such as poly(ethylenedioxythiophene) doped with poly(styrenesulfonic acid) (PEDOT:PSS) commercially available from H. C. Starck, Newton, Mass. under the trade designation "BAYTRON P". This conductive polymer can be added at low concentrations to sulfopolyester dispersions to provide antistatic compositions that provided good antistatic performance in combination with good adhesion particularly to polyester and cellulose acetate substrates.

In other embodiments, the antistatic coating or hardcoat composition may comprise conductive metal-containing particles, such as metals or semiconductive metal oxides. Such particles may also be described as nanoparticles having a particle size or associated particle size of greater than 1 nm and less than 200 nm. Various granular, nominally spherical, fine particles of crystalline semiconductive metal oxides are known. Such conductive particles are generally binary metal oxides doped with appropriate donor heteroatoms or containing oxygen deficiencies. Preferred doped conductive metal oxide granular particles include Sb-doped tin oxide, Al-doped zinc oxide, In-doped zinc oxide, and Sb-doped zinc oxide.

Various antistatic particles are commercially available as water-based and solvent-based dispersions. Antimony tin oxide (ATO) nanoparticle dispersions that can be used include a dispersion available from Air Products under the trade designation "Nano ATO 544A" (25 wt-% solids, water), 30 nm and 100 nm (20 wt-% solids, water) dispersions available from Advanced Nano Products Co. Ltd. (ANP), 30 nm and 100 nm ATO IPA sols (30 wt-%) also available from ANP, a dispersion available from Keeling & Walker Ltd under the trade designation "CPM10C" (19.1 wt-% solids), and a dispersion commercially available from Ishihara Sangyo Kaisha, Ltd under the trade designation "SN-100 D" (20 wt-% solids). Further, an antimony zinc oxide (AZO) IPA sol (20 nm, 20.8 wt-% solids) is available from Nissan Chemical America, Houston Tex. under the trade designations "CELNAX CX-Z2101P", "CELNAX CX-Z300H" (in water), "CELNAX CX-Z401M" (in methanol), and "CELNAX CX-Z653M-F" (in methanol).

For nanoparticle antistats, the antistatic agent is present in an amount of at least 20 wt-%. For conducting inorganic oxide nanoparticles, levels can be up to 80 wt % solids for refractive index modification. When a conductive polymer antistat is employed, it is generally preferred to employ as little as possible due to the strong absorption of the conductive polymer in the visible region. Accordingly, the concentration is generally no greater than 20 wt-% solid, and preferably less than 15 wt-%. In some embodiments the amount of conductive polymer ranges from 2 wt-% to 5 wt-% solids of the dried antistatic layer.

The perfluoropolyether urethane polymeric material alone or in combination with the hardcoat composition can be dispersed in a solvent to form a dilute coating composition. The amount of solids in the coating composition is typically at least 20 wt-% and usually no greater than about 50 wt-%. For some optical substrate such as polycarbonate, acrylic, cellulose acetate, and cellulose triacetate, it is preferred to employ an alcohol based solvent including for example methanol, ethyl alcohol, isopropyl alcohol, propanol, etc. as well as glycol ethers such as propylene glycol monomethyl ether or ethylene glycol monomethyl ether, etc. For such optical substrates, the coating compositions may contain predominantly alcohol solvent(s). For other uses, however, alcohol based solvent(s) may be combined with other (i.e. non-alcohol) solvents.

Thin coating layers can be applied to the optical substrate using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

A die coater generally refers to an apparatus that utilizes a first die block and a second die block to form a manifold cavity and a die slot. The coating fluid, under pressure, flows through the manifold cavity and out the coating slot to form a ribbon of coating material. Coatings can be applied as a single layer or as two or more superimposed layers. Although it is usually convenient for the substrate to be in the form of a continuous web, the substrate may also be a succession of discrete sheets.

The term "optical display", or "display panel", can refer to any conventional optical displays, including but not limited to multi-character multi-line displays such as liquid crystal displays ("LCDs"), plasma displays, front and rear projection displays, cathode ray tubes ("CRTs"), and signage, as well as single-character or binary displays such as light emitting diodes ("LEDs"), signal lamps, and switches. The exposed surface of such display panels may be referred to as a "lens." The invention is particularly useful for displays having a viewing surface that is susceptible to being touched or contacted by ink pens, markers and other marking devices, wiping cloths, paper items and the like.

The protective coatings of the invention can be employed in a variety of portable and non-portable information display articles. These articles include PDAs, cell phones (including combination PDA/cell phones), LCD televisions (direct lit and edge lit), touch sensitive screens, wrist watches, car navigation systems, global positioning systems, depth finders, calculators, electronic books, CD and DVD players, projection television screens, computer monitors, notebook computer displays, instrument gauges, instrument panel covers, signage such as graphic displays and the like. The viewing surfaces can have any conventional size and shape and can be planar or non-planar, although flat panel displays are preferred. The coating composition or coated film, can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, road pavement markers (e.g. raised) and pavement marking tapes, overhead projectors, stereo cabinet doors, stereo covers, watch covers, as well as optical and magneto-optical recording disks, and the like.

A variety of substrates can be utilized in the articles of the invention. Suitable substrate materials include glass as well as thermosetting or thermoplastic polymers such as polycarbonate, poly(meth)acrylate (e.g., polymethyl methacrylate or "PMMA"), polyolefins (e.g., polypropylene or "PP"), polyurethane, polyesters (e.g., polyethylene terephthalate or "PET"), polyamides, polyimides, phenolic resins, cellulose diacetate, cellulose triacetate, polystyrene, styrene-acrylonitrile copolymers, epoxies, and the like. Typically the substrate will be chosen based in part on the desired optical and mechanical properties for the intended use. Such mechanical properties typically will include flexibility, dimensional stability and impact resistance. The substrate thickness typically also will depend on the intended use. For most applications, a substrate thickness of less than about 0.5 mm is preferred, and is more preferably about 0.02 to about 0.2 mm. Self-supporting polymeric films are preferred. Films made from polyesters such as PET or polyolefins such as PP (polypropylene), PE (polyethylene) and PVC (polyvinyl chloride) are particularly preferred. The polymeric material can be formed into a film using conventional filmmaking techniques such as by extrusion and optional uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

Various light transmissive optical films are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150.

As described is U.S. Patent Application Publication 2003/0217806, multilayer optical films provide desirable transmission and/or reflection properties at least partially by an arrangement of microlayers of differing refractive index. The microlayers have different refractive index characteristics so that some light is reflected at interfaces between adjacent microlayers. The microlayers are sufficiently thin so that light reflected at a plurality of the interfaces undergoes constructive or destructive interference in order to give the film body the desired reflective or transmissive properties. For optical films designed to reflect light at ultraviolet, visible, or near-infrared wavelengths, each microlayer generally has an optical thickness (i.e., a physical thickness multiplied by refractive index) of less than about 1 µm. However, thicker layers can also be included, such as skin layers at the outer surfaces of the film, or protective boundary layers disposed within the film that separate packets of microlayers. Multilayer optical film bodies can also comprise one or more thick adhesive layers to bond two or more sheets of multilayer optical film in a laminate.

Further details of suitable multilayer optical films and related constructions can be found in U.S. Pat. No. 5,882,774 (Jonza et al.), and PCT Publications WO95/17303 (Ouderkirk et al.) and WO99/39224 (Ouderkirk et al.). Polymeric multilayer optical films and film bodies can comprise additional layers and coatings selected for their optical, mechanical, and/or chemical properties. See U.S. Pat. No. 6,368,699 (Gilbert et al.). The polymeric films and film bodies can also comprise inorganic layers, such as metal or metal oxide coatings or layers Various permanent and removable grade adhesive compositions may be coated on the opposite side (i.e. to the hardcoat) of the substrate so the article can be easily mounted to a display surface. Suitable adhesive compositions include (e.g. hydrogenated) block copolymers such as those commercially available from Kraton Polymers of Westhollow, Tex. under the trade designation "Kraton G-1657", as well as other (e.g. similar) thermoplastic rubbers. Other exemplary adhesives include acrylic-based, urethane-based, silicone-based, and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

GLOSSARY

For the following defined terms, these definitions shall be applied, unless a different definition is given in the claims or elsewhere in the specification.

"Free-radically polymerizable" refers to the ability of monomers, oligomers, polymers or the like to participate in crosslinking reactions upon exposure to a suitable source of free radicals.

"(Meth)acryl" refers to functional groups including acrylates, methacrylates, acrylamides, methacrylamides, alpha-fluoroacrylates, thioacrylates and thio-methacrylates. A preferred (meth)acryl group is acrylate.

"Monovalent perfluoropolyether moiety" refers to a perfluoropolyether chain having one end terminated by a perfluoroalkyl group.

Unless otherwise noted, "HFPO-" refers to the end group $F(CF(CF_3)CF_2O)aCF(CF_3)$— of the methyl ester $F(CF(CF_3)CF_2O)aCF(CF_3)C(O)OCH_3$, wherein "a" averages 2 to 15. In some embodiments, a averages between 3 and 10 or a averages between 5 and 8. Such species generally exist as a distribution or mixture of oligomers with a range of values for a, so that the average value of a may be non-integer. In one embodiment a averages 6.2. This methyl ester has an average molecular weight of 1,211 g/mol, and can be prepared according to the method reported in U.S. Pat. No. 3,250,808 (Moore et al.), with purification by fractional distillation.

The recitation of numerical ranges by endpoints includes all numbers subsumed within the range (e.g. the range 1 to 10 includes 1, 1.5, 3.33, and 10).

Objects and advantages of this invention are further illustrated by the following examples, but the particular materials and amounts thereof recited in these examples, as well as other conditions and details, should not be construed to unduly limit this invention.

EXAMPLES

Test Methods

1. Spots: The number of spots was determined visually in a 25 $cm^2$ area by counting the number of spots with the coating held against a black background. When the composition includes a particulate matting agent such as silica, the spots are white in appearance and can be more easily detected.

2. PGX Contact Angle: The static contact angle with water of Examples 4-12 was measured using a PGX goniometer from Fibro System AB, Sweden. A 4 microliter DI water drop was used and the PGX instrument automatically recorded the static contact angle.

3. Durability of Ink Repellency was assessed using a modified Oscillating Sand Method (ASTM F 735-94). An orbital shaker was used (VWR DS-500E, from VWR Bristol, Conn.). A disk of diameter 89 mm was cut from the sample, placed in a 16 ounce jar lid (jar W216922 from Wheaton, Millville, N.J.), and covered with 40 grams of 20-30 mesh Ottawa sand (VWR, Bristol, Conn.). The jar was capped and placed in the shaker set at 250 rpm for 5 minutes. After shaking, a Sharpie permanent marker was used to draw a line across the diameter of the disk surface. The portion of the ink line that did not bead up was measured. A measure of 89 mm is equal to 100% ink repellency loss; a measure of 0 mm would be perfect durability or 0% ink repellency (IR) loss.

4. Cellulose Surface Attraction Test—After the coated PET film was prepared it was allowed to condition for 24 hours at ambient temperature and 50%+/−10% relative humidity to allow it to be charged. After conditioning each coated PET sample was cleaned with a Simco "Viper" static neutralizing gun to remove any dust. Then 0.35 grams of alpha-cellulose (C-8002) from Sigma Chemical Company (St. Louis, Mo.) was applied to the top of the coating in a 7 cm diameter area. The coated film was tilted back and forth several times to allow the cellulose to evenly coat the 7 cm. diameter test area. The excess cellulose was then shaken off and the haze of the coating plus cellulose was measured according to ASTM D1003.

Synthesis of Perfluoropolyether Alcohol Starting Materials

HFPO—C(O)N(H)CH$_2$CH$_2$OH of different molecular weights (938.5, 1314, 1344, and 1547.2) were made by a procedure similar to that described in U.S. Publication No. 2004/0077775, entitled "Fluorochemical Composition Comprising a Fluorinated Polymer and Treatment of a Fibrous Substrate Therewith," filed on May 24, 2002, for Synthesis of HFPO-oligomer alcohols with the exception that HFPO methyl ester F(CF(CF$_3$)CF$_2$O)aCF(CF$_3$)C(O)CH$_3$ with a=6.2 was replaced with F(CF(CF3)CF2O)aCF(CF3)C(O)OCH3 wherein a=4.41, 6.67, 6.85, and 8.07 respectively.

The methyl ester material for preparation of the alcohol can be prepared according to the method reported in U.S. Pat. No. 3,250,808 (Moore et al.), with purification by fractional distillation.

1. HFPO—C(O)N(H)(CH$_2$CH$_2$O)$_3$H, MW 1329 was prepared according to the procedures for HFPO—C(O)N(H)CH$_2$CH$_2$OH, using F(CF(CF$_3$)CF$_2$O)$_a$CF(CF$_3$)C(O)CH$_3$ with a=6.2 (1211 MW) and substituting H$_2$N(CH$_2$CH$_2$O)$_3$H for H$_2$NCH$_2$CH$_2$OH.

2. HFPO—C(O)N(H)(CH$_2$)$_6$OH, MW 1297 was prepared according to the procedures for HFPO—C(O)N(H)CH$_2$CH$_2$OH, using F(CF(CF$_3$)CF$_2$O)$_a$CF(CF$_3$)C(O)CH$_3$ with a=6.2 (1211 MW) and substituting H$_2$N(CH$_2$)$_6$OH for H$_2$NCH$_2$CH$_2$OH Polyisocyanate was obtained from Bayer Polymers LLC, of Pittsburgh, Pa. under the trade designation "Desmodur N100". ("DesN100")

Polyisocyanate was obtained from Bayer Polymers LLC, of Pittsburgh, Pa. under the trade designation "Desmodur N3300". ("DesN3300")

Pentaerythritol triacrylate ("PET3A"), under the trade designation "SR444C", was obtained from Sartomer Company of Exton, Pa.

2,6-di-t-butyl-4-methylphenol (BHT) and dibutyltin dilaurate (DBTDL) are each available from Sigma Aldrich of Milwaukee, Wis.

Synthesis of Perfluoropolyether Urethane Multiacrylate

Example 1

Preparation of Des N100/0.85 PET3A/0.10 HFPO—C(O)NHCH$_2$CH$_2$OH/0.10C$_{18}$H$_{37}$(OCH$_2$CH$_2$)$_{10}$OH A 500 ml roundbottom flask equipped with magnetic stir bar was charged with 25.0 g (0.131 eq, 191 EW, 1.0 mole fraction) Des N100, 106.75 g methyl ethyl ketone (MEK), and 0.05 g BHT. The reaction was swirled to dissolve all the reactants, the flask was placed in a oil bath at 55 degrees Celsius, and fitted with a condenser under dry air. Sixty-five microliters of a 10% dibutyltin dilaurate solution in MEK was added to the reaction. Over 20 min, 17.59 g (0.0131 eq, 1344 EW, 0.10 mole fraction) F(CF(CF$_3$)CF$_2$O)$_{6.85}$CF(CF$_3$)C(O)NHCH$_2$CH$_2$OH was added to the reaction via addition funnel Two hours after the addition was complete, 9.07 g (0.0131 eq, 692.6 EW, 0.10 mole fraction) C$_{18}$H$_{37}$(OCH$_2$CH$_2$)$_{10}$OH (Brij 76) was added over 20 min. After reaction overnight, the following afternoon, 54.99 g (0.1115 eq, at 494.3 EW, 0.85 mole fraction) of Sartomer SR444C was added in one portion to the reaction which was allowed to proceed overnight. (The actual OH equivalent weight of the SR444C was 421.8, but 494.3 is used in calculations for all lots of SR444C, so that for any given material made, the weight percentage of SR444C will remain constant). The reaction was monitored by FTIR and initially showed an isocyanate absorption at 2273 cm$^{-1}$. This absorption was gone after reaction overnight, and 7.40 g of MEK was added to compensate for MEK lost during the reaction to adjust the final solids to 50% solids.

The perfluoropolyether urethane multiacrylates of Preparations 2-14, C1 and C2 were made by substantially the same procedure with 1.0 mole fraction (Des N100) isocyanate, the HFPO-alcohol at 0.10 mole fraction and each of the modifying alcohols at the mole fractions indicated in column 5 of the following Table 1. The HFPO—C(O)NHCH$_2$CH$_2$OH amidol of 1344 molecular weight was used for Example numbers C1, C3, 2, 3, 4, 5; whereas the HFPO—C(O)NHCH$_2$CH$_2$OH amidol of 1314 molecular weight was used for C2.

| Ex. No. | Trade Designation | Supplier, location | Modifying Alcohol Molecular Weight | PET3A/ Alcohol Mole Fraction |
|---|---|---|---|---|
| C1 | | | None | 0.95/0.0 |
| C2 | | Aldrich, St. Louis, MO | HO(CH$_2$)$_{10}$OH 1-10 decane diol Mn = 174.3 g/mole | 0.75/0.2 |
| C3 | Bisomer PEA6 | Cognis, Cincinnati, OH | HO(CH$_2$CH$_2$O)$_6$C(O)CH=C$_2$ Polyethylene glycol (6) monoacrylate | 0.75/0.2 |
| 2 | MA-100 | Nippon Nyukazai, Tokyo, Japan | HO(CH$_2$CH$_2$O)$_{10}$C(O)CH(CH$_3$)=CH2 Hydroxyl alkylene oxide methacrylate Mn = 517 g/mole | 0.85/0.1 |
| 3 | NOVEL II 810-10-10 | Sasol North America, Huston, TX. | 50:50 blend of HO—(CH$_2$CH$_2$O)$_{10}$C$_8$H$_{17}$ and HO—(CH$_2$CH$_2$O)$_{10}$C$_{10}$H$_{21}$ Mn = 592.4 g/mole | 0.85/0.1 |
| 4 | CALGENE 40-L | Lambent Technologies, Gurnee, IL | C$_{11}$H$_{23}$C(O)(CH$_2$CH$_2$O)$_{10}$OH Mn = 640 g/mole | 0.85/0.1 |
| 5 | Brij 78 | Uniqema, New Castle, DE | C$_{18}$H$_{37}$(OCH$_2$CH$_2$)$_{20}$OH Mn = 1058.5 g/mole | 0.85/0.1 |

Ex. 6 and C4—1.0 DES N3300/PET3A/0.1 HFPOC(O)NHCH$_2$CH$_2$OH/C$_{18}$H$_{37}$(OCH$_2$CH$_2$)$_{20}$OH Brij 78 at 50% solids in MEK. Both made with SR444C 421.8 EW., HFPOC(O)NHCH$_2$CH$_2$OH MW 1314, DES N3300 has an equivalent weight of 193.

| Example No. | PET3A/Alcohol Mole Fraction |
|---|---|
| C4 | 0.95/0.0 |
| 6 | 0.85/0.10 |

Ex. 7 and C5—1.0 DES N100/PET3A/0.1 HFPOC(O)NHCH$_2$CH$_2$OH C$_{18}$H$_{37}$(OCH$_2$CH$_2$)$_{20}$OH Brij 78 at 50% solids in MEK. Both made with SR444C 421.8 EW., HFPOC(O)NHCH$_2$CH$_2$OH MW 938.5.

| Example No. | PET3A/Alcohol Mole Fraction |
|---|---|
| C5 | 0.95/0.0 |
| 7 | 0.85/0.10 |

Ex. 8 and C6—1.0 DES N100/PET3A/0.1 HFPOC(O)NH(CH$_2$CH$_2$O)$_3$H/C$_{18}$H$_{37}$(OCH$_2$CH$_2$)$_{20}$OH Brij 78 at 50% solids in MEK.

Both made with SR444C 421.8 EW., HFPOC(O)NH(CH$_2$CH$_2$O)$_3$H MW 1329

| Example No. | PET3A/Alcohol Mole Fraction |
|---|---|
| C6 | 0.95/0.0 |
| 8 | 0.85/0.10 |

Ex. 9 and 10—1.0 DES N100/0.1 PET3A/0.1 HFPOC(O)NHCH$_2$CH$_2$OH/Modifying Alcohol at 50% solids in MEK. Both made with SR444C 421.8 EW., HFPOC(O)NHCH$_2$CH$_2$OH MW 1314

| Example No. | Trade Designation | Supplier, location | Modifying Alcohol, Molecular Weight | PET3A/ Alcohol Mole Fraction |
|---|---|---|---|---|
| 9 | "Carbowax MPEG 550" | Dow Chemical Co., Midland, MI | CH$_3$—(OCH$_2$CH$_2$)$_{13}$—OH Mn = 553 g/mole | 0.85/0.1 |
| 10 | "Carbowax PEG 900" | Dow Chemical Co., Midland, MI | H—(OCH$_2$CH$_2$)$_{20}$—OH Mn = 900 g/mole | 0.85/0.20 |

The perfluoropolyether urethane multiacrylates of Examples 11-12 and C7 and C8 were made by substantially the same procedure with 1.0 mole fraction (Des N100) isocyanate and the HFPO-alcohol (MW=1314) amounts indicated in column 2 and the modifying alcohols indicated in column 3, at the ew amounts indicated in column 4 of the following Table 3:

| Example No. | HFPO Mole fraction | Modifying Alcohol | PET3A/ Alcohol Mole Fractions |
|---|---|---|---|
| C7 | 0.25 | None | 0.8/0.0 |
| 11 | 0.25 | C$_{18}$H$_{37}$(OCH$_2$CH$_2$)$_{20}$OH Brij 78 | 0.65/0.15 |
| 12 | 0.25 | C$_{18}$H$_{37}$(OCH$_2$CH$_2$)$_{20}$OH Brij 78 | 0.55/0.25 |

Ex. 13 and C8—1.0 DES N100/PET3A/0.1 HFPOC(O)NHCH$_2$CH$_2$OH/C$_{18}$H$_{37}$(OCH$_2$CH$_2$)$_{20}$OH Brij 78 at 50% solids in MEK. Both made with SR444C 421.8 EW., HFPOC(O)NHCH$_2$CH$_2$OH MW 1547

| Example No. | PET3A/Alcohol Mole Fraction |
|---|---|
| C8 | 0.95/0.0 |
| 13 | 0.85/0.10 |

Ceramer Hardcoat Comprising the Perfluoropolyether Urethane Multiacrylates

The ceramer hardcoat base compositions ("HCB-1", "HCB-2" and "HCB-3") used in the examples were made as described in column 10, line 25-39 and Example 1 of U.S. Pat. No. 5,677,050 to Bilkadi, et al. with the following (wt-% solids) additions:

| Material | HCB-1 | HCB-2 | HCB-3 |
|---|---|---|---|
| Example 1, No. 5,677,050 (solids) | 94.4 | | |
| Syloid C803 (silica) | 2.8 | 2.75 | 2.7 |
| Disperbyk 163 (dispersant) | 2.8 | 2.75 | 2.7 |
| Sartomer SR 295 | | 46.75 | |
| Sartomer SR 238 | | 46.75 | |
| Irgacure 819 | | 1.0 | |
| SM Zirconia | | | 74.1 |
| Irgacure 184 | | | 1.4 |
| Sartomer 399 | | | 19.1 |

Syloid C 803 is a fine silica from W.R. Grace and Co., Columbia, MD
Disperbyk 163 is a dispersant from Byk-Chemie USA, Wallingford, CT
Irgacure 819 and 184 are photoinitiators from Ciba Specialty Chemicals, Tarrytown, NY
Sartomer SR 295, SR238, SR399 are all multifunctional acrylate monomers from Sartomer Corp., West Chester, PA ZrO$_2$ sols (40.8% solids in water) was prepared were prepared in accordance with the procedures described in U.S. Patent Publication No. 2006/0204745 that claims priority to U.S. patent application Ser. No. 11/078,468 filed Mar. 11, 2005. The resulting ZrO$_2$ sols were evaluated with Photo Correlation Spectroscopy (PCS), X-Ray Diffraction and Thermal Gravimetric Analysis as described in U.S. Patent Publication No. 2006/0204745- and application Ser. No. 11/078,468. The ZrO$_2$ sols used in the examples had properties in the ranges that follow:

| | PCS Data | | |
|---|---|---|---|
| Dispersion Index | Intensity avg size (nm) | Volume- avg size (nm) | (Intensity- avg)/(Volume- avg) |
| 1.0-2.4 | 23.0-37.0 | 8.0-18.8 | 1.84-2.97 |

| Relative Intensities | | Apparent Crystallite Size (nm) | | | | | Weighted |
|---|---|---|---|---|---|---|---|
| Cubic/Tetragonal | Monoclinic | (C,T) (1 1 1) | M (−1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

Surface Modified Zirconia Nanoparticles (SM Zirconia)

20.4 lbs of an aqueous dispersion of 10 nm zirconia nanoparticles (40.8% solids in water) was added to a 10 gallon reactor. 12.9 lbs additional water and 33.3 lbs 1-methoxy-2-propanol were added to the reactor with stirring. 2.5 lbs of 3-methacryloxypropyltrimethoxysilane was added slowly to the reactor with stirring. 0.021 lbs of a 5% solution in water of Prostab 5198 was added to the reactor with stirring. The mixture was stirred 18 hours at 80° C.

The reaction mixture was heated under vacuum (24-40 ton) and the 1-methoxy-2-propanol/water azeotrope was distilled off to remove substantially all of the water, while slowly adding 70.5 lbs of additional 1-methoxy-2-propanol. 0.4 lbs of 30% ammonium hydroxide was added to the reaction mixture, then the reaction was concentrated to 59.2% solids by distilling off 1-methoxy-2-propanol. The surface modification reaction resulted in a mixture containing 59.2% surface modified zirconia ($ZrO_2$—SM), by weight, in 1-methoxy-2-propanol. The final mixture was filtered through a 1 micron filter.

Coating and Curing of Hardcoat Composition on Optical Film

Solutions were prepared at 30% solids in a solvent blend of 1:1 isopropanol:propylene glycol methyl ether and coated to yield a dry thickness of about 4 microns using a number 12 wire wound rod onto 5-mil Melinex 618 film. The coatings were dried in a 100 degree Celsius oven for 2 minutes and then placed on a conveyer belt coupled to a ultraviolet ("UV") light curing device and UV cured under nitrogen using a Fusion 500 watt H bulb at 30 ft/min. The values reported in the Tables refer to the percent solids of each component of the dried coating. The coatings were then visually inspected for surface smoothness (dewetting). The coatings were also tested for durability of ink repellency. Results are shown in Tables 4 and 5.

TABLE 4

Hardcoat Composition Comprising Perfluoropolyether (PFPE) Urethane Additive

| | Wt-% solids | Wt-% Solids PFPE Urethane | PFPE Urethane Example No. | Spots (per cm$^2$) | Contact Angle |
|---|---|---|---|---|---|
| HCB-1 in coating | | | | | |
| HC-1 | 99.4 | 0.6 | C1 | 1.2 | 100 |
| HC-2 | 99.4 | 0.6 | C2 | 0.32 | 100 |
| HC-3 | 99.4 | 0.6 | C3 | 0.36 | 105 |
| Ex. 14 | 99.4 | 0.6 | 2 | 0.2 | 105 |
| Ex. 15 | 99.4 | 0.6 | 1 | 0.04 | 102 |
| Ex. 16 | 99.4 | 0.6 | 3 | 0.08 | 102 |
| Ex. 17 | 99.4 | 0.6 | 4 | 0.04 | 105 |
| Ex. 18 | 99.4 | 0.6 | 5 | 0 | 103 |
| HC-4 | 99.4 | 0.6 | C4 | 1.6 | 104 |
| Ex. 19 | 99.4 | 0.6 | 6 | 0.8 | 102 |
| HC-5 | 99.4 | 0.6 | C5 | 0.04 | 95 |
| Ex. 20 | 99.4 | 0.6 | 7 | 0.04 | 94 |
| HC-6 | 99.4 | 0.6 | C6 | 0.28 | 103 |
| Ex. 21 | 99.4 | 0.6 | 8 | 0.04 | 102 |
| Ex. 22 | 99.4 | 0.6 | 9 | 0.04 | 105 |
| Ex. 23 | 99.4 | 0.6 | 10 | 0.12 | 100 |
| HC-7 | 99.4 | 0.6 | C7 | 2.8 | 103 |
| Ex. 24 | 99.4 | 0.6 | 11 | 2.8 | 103 |
| Ex. 25 | 99.4 | 0.6 | 12 | 0.88 | 94 |
| HC-8 | 99.4 | 0.6 | C8 | 0.16 | 106 |
| Ex. 26 | 99.4 | 0.6 | 13 | 0.04 | 102 |
| HCB-2 | | | | | |
| HC-9 | 99.4 | 0.6 | C1 | 0.36 | 102 |
| Ex. 27 | 99.4 | 0.6 | 5 | 0.16 | 93 |
| HCB-3 | | | | | |
| HC-10 | 99.4 | 0.6 | C1 | 0.6 | 103 |
| Ex. 28 | 99.4 | 0.6 | 5 | 0.24 | 94 |

Examples 16-18 were tested for Durability of Ink Repellency.

The results are as follows:

TABLE 5

| | Durability of Ink Repellency (% loss) |
|---|---|
| HC1 Comparative | 0 |
| Example 16 | 0 |
| Example 17 | 11 |
| Example 18 | 34 |

The perfluoropolyether urethane multiacrylates of Examples 29-32 were made by substantially the same procedure as Example 1, with 1.0 mole fraction (Des N100) isocyanate and the HFPO-alcohol (MW=1344) mole fractions indicated in column 2 and the modifying alcohols indicated in column 3, at the equivalent fractions indicated in column 6

TABLE 6

| Example No. | HFPO Mole fraction | Trade Designation | Supplier, location | Modifying Alcohol, Molecular Weight | PET3A/ Alcohol Equivalent Fraction |
|---|---|---|---|---|---|
| 29 | 0.10 | "Carbowax MPEG 1450 Diol" | Dow Chemical Co., Midland, MI | H(OCH$_2$CH$_2$)$_{32}$—OH Mn~1450 g/mole | 0.85/0.1 |
| 30 | 0.15 | "Carbowax MPEG 750" | Dow Chemical Co., Midland, MI | CH$_3$—(OCH$_2$CH$_2$)$_{13}$—OH Mn = 553 g/mole | 0.60/0.30 |
| 31 | 0.15 | "Carbowax MPEG 750" | Dow Chemical Co., Midland, MI | CH$_3$—(OCH$_2$CH$_2$)$_{13}$—OH Mn = 553 g/mole | 0.30/0.60 |
| 32 | 0.20 | "Carbowax MPEG 750" | Dow Chemical Co., Midland, MI | CH$_3$—(OCH$_2$CH$_2$)$_{13}$—OH Mn = 553 g/mole | 0.35/0.50 |

Coating Composition Preparation—To 62.5 grams of a ceramer hardcoat composition (as described in column 10, line 25-39 and Example 1 of U.S. Pat. No. 5,677,050 to Bilkadi, et al.) was added 18.75 grams of ethyl acetate and 18.75 grams of methoxy propanol. Various HFPO Urethane Acrylates were combined with this diluted ceramer hardcoat composition as set forth in Table 7.

TABLE 7

Additives in Hardcoat Coating Composition

| Sample No. | Wt-% Solids HFPO Urethane | HFPO Urethane type |
|---|---|---|
| 33 | 0.4 | 29 |
| 34 | 2.5 | 30 |
| 35 | 2.5 | 31 |
| 36 | 3.3 | 32 |

(For Sample 36, 37.5 grams of methoxy propanol and 0 grams of ethyl acetate was used for dilution)

The hardcoat was coated onto an antistatic layer that was formed on the PET as follows: A coating solution was prepared by combining 970.8 g deionized water, 19.23 g of PEDOT/PSS (Baytron® P from H. C. Starck, 1.3 wt % solids), 7.5 g of surfactant (Tomadol® 25-9 from Tomah Products, 10 wt % in deionized water), and 2.5 g N-methylpyrrolidinone. This deep blue solution (0.025 wt % PEDOT/PSS) was coated on primed 5 mil PET film (prepared according to Example 29 of U.S. Pat. No. 6,893,731 B2) using a 4-in die coater. The web speed was 35 ft/min and the solution flow rate was 12.4 g/min Hot zone temperatures were 140° F. in the gap dryer and 140° F., 160° F., and 180° F. in the ovens. The hard coat solution was coated onto this antistat coated polyester using a #12 wire wound rod and dried at 70° C. for 2 minutes. The dried coating having a thickness of about 4 microns was then cured with a Light Hammer 6 UV source using a Fusion H bulb (Fusion UV Systems, Inc., Gaithersburg, Md.), at 100% power, under nitrogen at 30 feet/min.

TABLE 8

Test Results

| Sample | Water Static Contact Angle | Cellulose Surface Attraction Test |
|---|---|---|
| 33 | 102 | 7% |
| 34 | 101 | 9 |
| 35 | 95 | 7 |
| 36 | 105 | 1 |

What is claimed is:

1. A free-radically polymerizable composition comprising a mixture of reaction products of
   i) at least one polyisocyanate;
   ii) at least one isocyanate reactive perfluoropolyether compound;
   iii) at least one isocyanate reactive compound comprising greater than 6 repeat units of ethylene oxide; and
   iv) at least one isocyanate reactive non-fluorinated crosslinker comprising at least two free-radically polymerizable groups;

wherein the reaction product comprises a multifunctional perfluoropolyether urethane composition having the general formula

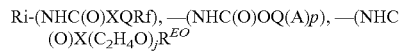

wherein Ri is a residue of a multi-isocyanate;
   X are each independently O, S or NR, where R is H or lower alkyl of 1 to 4 carbon atoms;
   Q is independently a straight chain, branched chain, or cyclic-containing connecting group having a valency at least 2;
   Rf is a monovalent perfluoropolyether moiety composed of groups comprising the formula F(RfcO)xCdF2d-, wherein each Rfc independently represents a fluorinated alkylene group having from 1 to 6 carbon atoms, each x independently represents an integer greater than or equal to 2, and wherein d is an integer from 1 to 6;
   A is a (meth)acryl functional group —XC(O)C(R2)=CH2, where R2 is a lower alkyl of 1 to 4 carbon atoms or H or F;
   p is 2 to 6;
   j ranges from 7 to 50; and
   $R^{EO}$ is H, a group selected from alkyl, aryl, alkaryl, aralkyl, that can optionally be substituted with a heteroatom, a heteroatom functional groups, or a (meth)acryl functional group; or —C(O)C(R$_2$)=CH$_2$ where R$_2$ is a lower alkyl of 1 to 4 carbon atoms or H or F.

2. The composition of claim 1 dispersed in an alcohol-containing solvent.

3. The composition of claim 1 wherein ii) and iii) comprise alcohol isocyanate reactive groups.

4. The composition of claim 1 further comprising a non-fluorinated binder precursor.

5. The composition of claim 1 further comprising inorganic oxide particles.

6. The composition of claim 1 wherein the perfluoropolyether material comprises at least two (meth)acrylate groups.

7. The composition of claim 1 wherein the perfluoropolyether material is a perfluoropolyether urethane material.

8. The composition of claim 3 wherein the perfluoropolyether urethane comprises a terminal group having at least two (meth)acrylate groups.

9. The composition of claim 1 wherein the perfluoropolyether urethane comprises a monovalent perfluoropolyether moiety.

10. The composition of claim 9 wherein the perfluoropolyether moiety is $F(CF(CF_3)CF_2O)_aCF(CF_3)-$ wherein a ranges from 4 to 15.

11. The composition of claim 1 wherein the non-fluorinated binder precursor comprising at least three free-radically polymerizable groups.

12. The composition of claim 1 wherein
$R^{EO}$ is H or a group selected from alkyl, aryl, alkaryl, aralkyl, that can optionally be substituted with a heteroatom.

13. The composition of claim 1 wherein Q comprises a nitrogen containing group.

14. The composition of claim 1 wherein Q contains an amide group.

15. The composition of claim 14 wherein Q is selected from $-C(O)NHCH_2CH_2-$, $-C(O)NH(CH_2)_6-$, and $-C(O)NH(CH_2CH_2O)CH_2CH_2-$.

16. The composition of claim 1 wherein $R^{EO}$ is H or alkyl.

17. A coating composition comprising the composition of claim 1.

18. The coating composition of claim 17 wherein the coating composition comprises a non-fluorinated binder precursor.

19. A substrate having a surface layer comprising the reaction product of the coating composition of claim 18.

20. The substrate of claim 18 wherein the surface layer exhibits a cellulose surface attraction of no greater than 10%.

* * * * *

UNITED STATES PATENT AND TRADEMARK OFFICE
CERTIFICATE OF CORRECTION

PATENT NO. : 8,383,694 B2
APPLICATION NO. : 13/396158
DATED : February 26, 2013
INVENTOR(S) : Thomas P Klun It is certified that error appears in the above-identified patent and that said Letters Patent is hereby corrected as shown below:

In the Specification:

Column 2
Line 30, Delete "tranmissive" and insert -- transmissive --, therefor.

Column 3
Line 21, Delete "unitcontaining" and insert -- unit containing --, therefor.
Line 29, Delete "know" and insert -- known --, therefor.
Line 63, Delete ""Vestanate" and insert -- "Vestanat --, therefor.

Column 4
Line 15, Delete "allophonate" and insert -- allophanate --, therefor.
Line 21, Delete "3600"" and insert -- 3600". --, therefor.

Column 5
Line 26-27, Delete "heteoratom" and insert -- heteroatom --, therefor.
Line 53, Delete "—XC(O)C(R$^2$)" and insert -- —XC(O)C(R2) --, therefor.

Column 6
Line 61-62, Delete "heteoratom" and insert -- heteroatom --, therefor.

Column 8
Line 59, Delete "glyceral" and insert -- glycerol --, therefor.

Column 13
Line 22, Delete "544A"" and insert -- S44A" --, therefor.
Line 33, Delete "CX-Z2101P"," and insert -- CX-Z210IP", --, therefor.

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,383,694 B2

In the Specification:

Column 15
Line 47, Delete "layers" and insert -- layers. --, therefor.

Column 17
Line 35, After "OH" insert -- . --.

Column 18
Line 22, Delete "funnel" and insert -- funnel. --, therefor.

Column 20
Line 46, Delete "SR 295," and insert -- SR295, --, therefor.

Column 21
Line 19, Delete "ton" and insert -- torr --, therefor.

In the Claims:

Column 24
Line 55, In Claim 1, delete "heteoratom" and insert -- heteroatom --, therefor.